J. R. HARBAUGH.
Plow Attachment.
No. 228,192. Patented June 1, 1880.
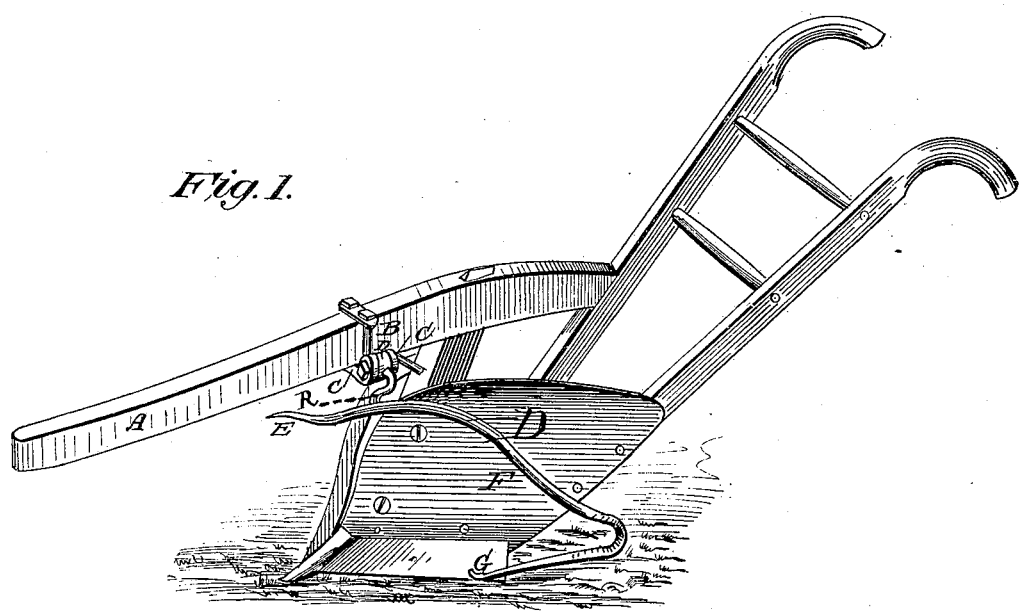
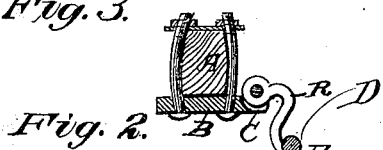
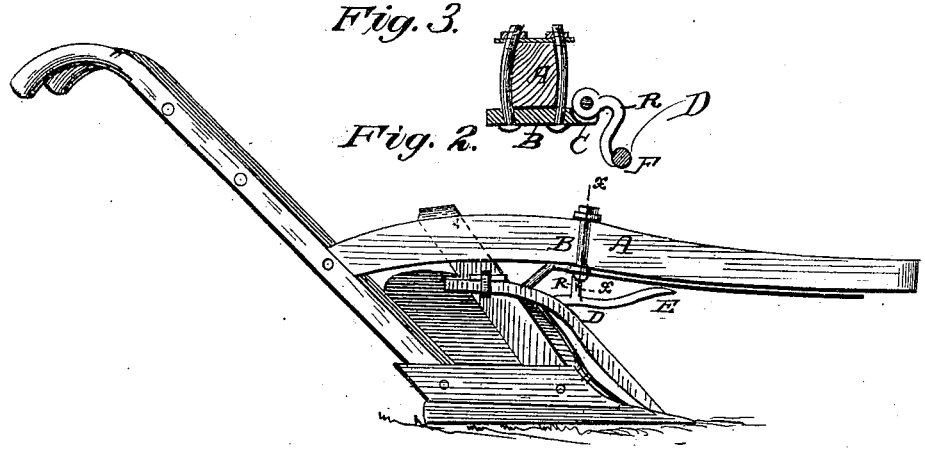
Witnesses:
Fred. G. Dieterich
J. R. Littell
Inventor,
John R. Harbaugh,
by Crowd & Co.
Attorneys.

UNITED STATES PATENT OFFICE.

JOHN R. HARBAUGH, OF CICERO, INDIANA.

PLOW ATTACHMENT.

SPECIFICATION forming part of Letters Patent No. 228,192, dated June 1, 1880.

Application filed February 18, 1880.

*To all whom it may concern:*

Be it known that I, JOHN R. HARBAUGH, of Cicero, in the county of Hamilton and State of Indiana, have invented certain new and useful Improvements in Plow Attachments; and I do hereby declare that the following is a full, clear, and exact description of the invention, which will enable others skilled in the art to which it appertains to make and use the same, reference being had to the accompanying drawings, which form a part of this specification.

Figure 1 is a perspective view. Fig. 2 is a side view; and Fig. 3 is a cross-section on the line $x\ x$, Fig. 2.

Corresponding parts in the several figures are denoted by like letters of reference.

This invention relates to weed or grass turning attachments for plows; and it consists in certain improvements in the construction of the same, which will be hereinafter fully described, and particularly pointed out in the claim.

In the annexed drawings, A represents the beam of an ordinary plow, in the construction of which no novelty is claimed. B is a clip attached upon the beam in front of the mold-board, and provided with laterally-projecting vertical lugs C C, between which is hinged a bracket, R, carrying the drag D, of the construction shown in the drawings, by reference to which it will be seen that it consists of a point, E, projecting forward under the beam, and a hook, F, passing downward and rearward alongside the mold-board. At its lower end the hook F is bent in a forward direction and terminates in an upwardly-turned point, G.

The object of the drag D is to gather the grass, weeds, &c., and drag them down into the furrow, where they are covered by the dirt which is being turned by the plow.

The drag being hinged, as shown, it may at any time be raised to avoid stones, stumps, and other obstructions.

It may be attached by the clip to any ordinary plow.

I am aware that weed-covering attachments consisting of drag-hooks pivoted to plow-beams are not new, broadly, and such I do not claim.

Having thus described my invention, I claim and desire to secure by Letters Patent of the United States—

The combination, with the plow-beam, of the clip B, having laterally-projecting vertical lugs C C, and the bracket R, pivoted between said lugs and carrying a drag, D, consisting of a hook, F, terminating at one end beneath the plow-beam in a point, E, and extending downward and rearward alongside of the mold-board, and thence forward, and terminating in an upwardly-turned point, G, substantially as and for the purposes set forth.

In testimony that I claim the foregoing as my own I have hereto affixed my signature in presence of two witnesses.

JOHN R. HARBAUGH.

Witnesses:
WILLIAM SOWERWINE,
JONATHAN WILLITS.